Nov. 21, 1961     L. E. HENYON     3,009,553
CLUTCH OPERATING MECHANISM
Filed April 11, 1960
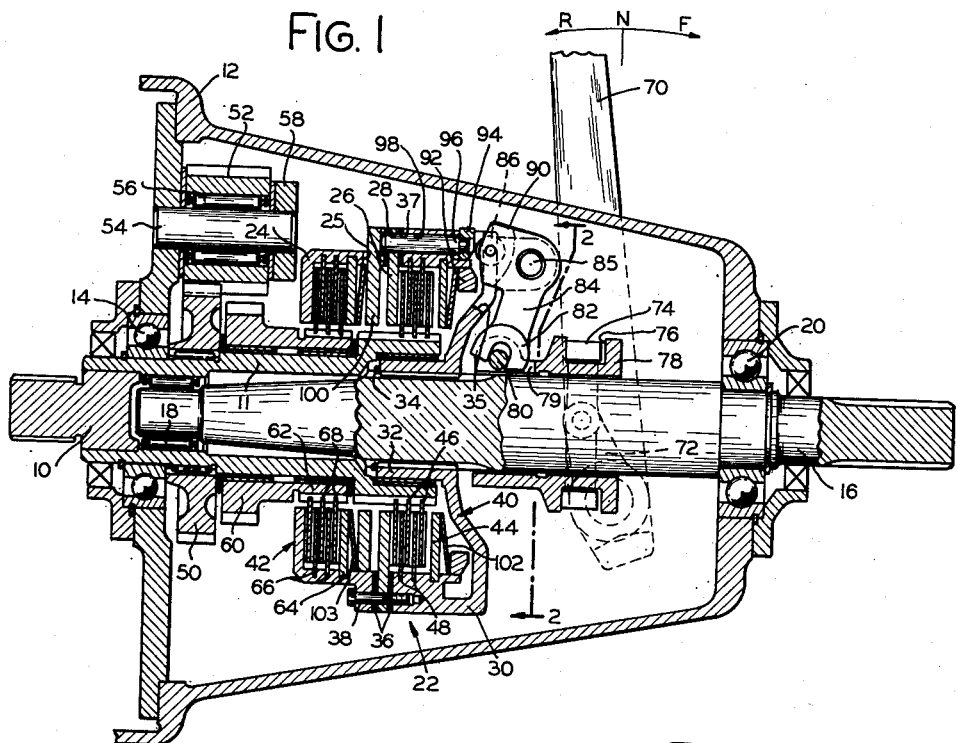
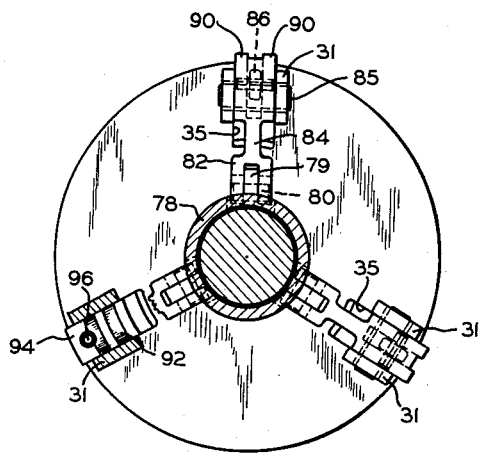
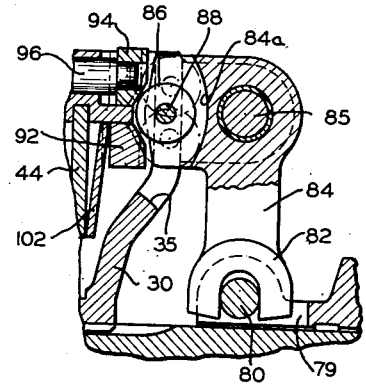
INVENTOR.
LEWIS E. HENYON
BY
Kenneth C. Witt
ATTORNEY

United States Patent Office 3,009,553
Patented Nov. 21, 1961

3,009,553
CLUTCH OPERATING MECHANISM
Lewis E. Henyon, Jackson, Mich., assignor to Clark Equipment Company, a corporation of Michigan
Filed Apr. 11, 1960, Ser. No. 21,497
4 Claims. (Cl. 192—48)

This invention relates to operating mechanisms for friction clutches and other friction engaging devices, and more particularly to mechanical operating mechanisms, as distinguished from fluid or electrical operating mechanisms, for such devices.

While the invention is described and illustrated herein in a preferred form suitable for the selective operation of a pair of multiple disc clutches, it will be readily appreciated that the invention is not limited to such application.

The object of the invention is to provide such an operating mechanism which is of simple, low-cost construction and is easy to manufacture and assemble, and at the same time is durable and easy to operate.

In carrying out my invention in one preferred form, I provide a mechanism which includes a plurality of levers positioned outside and at one end of a clutch drum assembly and extending radially outward from the output shaft. The levers are pivotally mounted on the drum assembly which is common to a pair of clutches. When the levers are moved from their neutral position they depress either a ramp ring which causes engagement of one of the clutches or a plurality of ramp caps which through a rod and energizing plate arrangement causes engagement of the other clutch.

For a clearer and more complete understanding of my invention, reference should be had to the accompanying drawing in which FIGURE 1 is a side elevation in section showing a transmission having a pair of multiple disc clutches and embodying the clutch operating mechanism of my invention, FIGURE 2 is a section along the line 2—2 in FIG. 1, and FIGURE 3 is an enlarged fragmentary view partially in section of a portion of the clutch operating mechanism shown in FIG. 1.

A rotatable input shaft 10 having an axially extending hollow or quill portion 11 secured thereon and adapted to be driven by a suitable power source (not shown) is journalled in a transmission housing 12 by means of ball bearings 14. A rotatable output shaft 16 is telescoped within the quill portion 11 and journalled by roller or needle bearings 18 and ball bearings 20 in the quill portion 11 and the housing 12 respectively.

An annular drum assembly indicated generally by the numeral 22 is carried on the output shaft 16 and revolves with it. The drum assembly 22 comprises one clutch housing portion 24 which has a plurality of circumferentially spaced slots 25, an intermediate plate portion 26 having a plurality of circumferentially spaced holes 28 therein for a reason hereinafter explained, and another housing portion 30 which has a plurality of bifurcated axially extending bosses or projections 31 for a reason later made clear. The housing portion 30 includes a reentrant portion 32 which is splined to the output shaft 16 and held against axial movement by a snap ring 34. The housing portion 30 also is provided with a plurality of openings or slots 35 in the end walls located respectively between the bifurcations of bosses 31. Interposed between plate portion 26 and the housing portion 24 on one side and the housing portion 30 on the other side are wear adjustment spacers or shims 36 which have spaced holes 37 therein in register with holes 28 in portion 26. The entire drum assembly 22 is held together by a suitable means, such as machine screws, one of which is shown at 38.

A pair of clutch assemblies 40 and 42 are carried in part by the drum assembly 22. The first mentioned clutch assembly 40 selectively connects the input shaft 10 with the output shaft 16 and comprises a pressure plate 44 and discs 46 splined to the extension portion 11 on the input shaft 10 interleaved with discs 48 splined to the portion 30 of the drum assembly 22. The input shaft 10 and the output shaft 16 may be connected by the other clutch assembly 42 through a gear train comprising a gear 50 splined to extension portion 11 on the input shaft 10 and in constant mesh with another gear 52 journalled on a pin 54 by roller bearings 56 and held in place by a retaining ring 58, an idler gear (not shown) which is in constant mesh with gear 52 and another gear 60 rotatably mounted on the input shaft 10 by suitable means, such as needle bearings, and having an axial extension 62. The clutch assembly 42 comprises a pressure plate 64 and discs 66 splined to the housing portion 24 of the drum assembly 22 interleaved with discs 68 splined to the above mentioned axial extension 62 on gear 60.

A shift lever 70 is connected to a shift yoke 72 pivotally mounted in the housing 12. Connected to the shift yoke 72 is a collar 74 which is positioned in a groove 76 in a sleeve 78 mounted on the output shaft 16 and axially slidable thereon. One end of the sleeve 78 has a plurality of axial extension 79 which carry respectively a plurality of pins 80. The pins 80 are received by the U-shaped bifurcations 82 on the inner ends of a plurality of bell crank levers 84 extending radially outwardly from the sleeve 78. The levers 84 are pivotally mounted by pins 85 on the bosses 31 of the housing portion 30 of the drum assembly 22. The axially projecting end 84a of each bell crank 84 is bifurcated and carries a roller 86 rotatably mounted on a pin 88 between the bifurcations 90. The levers 84 have a neutral position, a position which depresses a ramp ring 92, and a position which depresses a plurality of sector shaped ramp caps 94. See the left lower portion of FIG. 2 for an end view of a cap 94 with its lever 84 partially broken away. The ramp caps 94 respectively fit over the ends of a plurality of rods 96 which extend through a plurality of holes 98 in the portion 30 of the drum assembly 22 and aligned holes 28 and 37. The other end of the rods 96 butt against an annular energizing plate 100 which has portions projecting outwardly through the slots 25 in member 24 in register with the rods 96. The ramp ring 92 and the energizing plate 100 are separated from the pressure plates 44 and 64 by Belleville (spring) washers 102 and 103 respectively.

For a description of the operation of my improved clutch operating mechanism, let it be assumed that the input shaft 10 is rotating in a counterclockwise direction as viewed in FIG. 2 and that the shift lever 70 is moved from its neutral position to the left as shown in FIG. 1. FIG. 3 illustrates the position of the operating mechanism when shift lever 70 is in neutral while FIG. 1 shows the condition of the operating mechanism and the clutches when the shift lever is moved to the left. Movement of the shift lever to the left causes the sleeve 78 to be shifted to the left and in turn produces clockwise movement of the crank levers 84 (as seen in FIGS. 1 and 3). Such movement of the levers 84 causes the rollers 86 to roll up the ramps of the sector cap members 94 and over the apex and lock in the over-center position. Movement of the rollers 86 along the ramps of the caps 94 moves such caps and the rods 96 upon which they are mounted to the left. The movement of the rods 96 to the left causes the energizing plate 100 to press the spring washer 103 against the pressure plate 64, thereby compressing the assembly of discs 66 and 68 and causing the clutch assembly 42 to become engaged and thus frictionally connect the drum assembly 22 to the gear 60. Since gear 60 turns in the opposite direction from shaft 10 because of the interposed gear train in this typical embodiment of the invention, the connection of the gear 60 to the output shaft 16 through the drum assembly 22 causes the output shaft to turn in a clockwise direction which is designated as reverse in this transmission.

Movement of the shift lever to the right causes the sleeve 78 also to be moved to the right, thus causing the levers 84 to pivot in a counterclockwise direction. This disengages the clutch 42 if such rightward movement of the lever 70 occurs when the operating mechanism is in the condition illustrated in FIG. 1. Continued rightward movement of lever 70 causes the clutch operating mechanism to move through the neutral position illustrated in FIG. 3 to a position which engages clutch 40. This is brought about by the counterclockwise movement (as seen in FIGS. 1 and 3) of the levers 84 which causes the rollers to run up the ramps on ring 92 thereby depressing the ring and ultimately locking the rollers 86 in an over-center position when the rollers pass the apex on ring 92. The depressed ramp ring 92 causes the spring washer 102 to press against the pressure plate 44, thereby compressing the interleaved discs of the clutch assembly 40 and causing the drum assembly 22 to be frictionally connected directly with the input shaft 10. This in turn causes the output shaft 16 to rotate in a counterclockwise direction the same as shaft 10, and this is indicated as the forward drive condition of the transmission. Clutch 40 may be disconnected, of course, by moving the shift lever 70 back to the neutral position.

The clutch assemblies 40 and 42 can be adjusted for wear by either removing or adding shims 36 on either side of the plate portion 26 of the drum assembly 22.

While I have herein shown and described the features of my invention in one preferred form, it will be recognized that numerous changes, modifications and substitutions of equivalents may be made therein without departing from the spirit and scope of my invention. For example, while the invention is shown and described herein in a form useful with a pair of clutches, it will be apparent that it could be readily adapted for use with other friction devices such as brakes. As a consequence, it is not my intention to be limited to the particular form of my invention herein shown and described nor otherwise except as set forth in the appended claims.

I claim:

1. An operating mechanism for a friction device, comprising an annular drum assembly member adaptable for supporting a portion of a friction device, a plurality of levers pivotally mounted on the said drum assembly in radially disposed relation, the said levers having a neutral position and being jointly pivotally movable axially in either direction from the said neutral position, an energizing plate carried by the said drum assembly, a plurality of rods equal in number to the said levers positioned in longitudinally disposed relation and having their one ends abutting against the said energizing plate, ramp means on the other ends of the said rods, ramp engaging means on the said levers arranged to engage respectively the said ramp means on the rods only when said levers are pivoted in one predetermined direction from the said neutral position, and operating means engaging the said levers for pivoting them in said one predetermined direction whereby to move the said rods longitudinally through the action of the said ramp engaging means on the said ramp means and thereby move the said energizing plate.

2. An operating mechanism for a pair of friction devices carried in part by a common annular drum assembly, comprising a plurality of bell crank levers pivotally mounted on the said drum assembly in radially disposed relation, the said levers having a neutral position and being jointly pivotally movable axially in either direction from the said neutral position, a friction device energizing plate carried by the said drum assembly arranged for applying one of the friction devices, a plurality of rods equal in number to the number of the said levers carried by the drum assembly, the said rods being horizontally disposed and having their one ends positioned for abutting the said energizing plate, ramp means on the other ends of the said rods, a ramp ring for applying the other friction device located adjacent the said ramp ends of the rods, a plurality of ramp engaging means on the said levers arranged to engage the said ramp means only when said levers are moved in one direction from the said neutral position and the said ramp ring only when the levers are moved in the other direction from the neutral position for selectively applying the friction devices, and operating means connected to the said levers and arranged to move them for engaging the said ramp engaging means with the said ramp means and the said ramp ring selectively.

3. For use in a transmission having an input shaft and an output shaft selectively connectable to the input shaft by either of a pair of clutch assemblies the combination which includes a drum assembly comprising in seriatim a first clutch housing portion, an intermediate plate portion and a second housing portion having a reentrant part connectable to the output shaft, spacer members interposed between the said intermediate plate portion and the said first clutch housing portion on one side and the said second clutch housing portion on the other side thereof, an energizing plate carried by the said drum assembly and located adjacent the said intermediate plate on the side of the said first clutch housing portion, the said second clutch housing portion and the said intermediate plate and spacer members having a plurality of axially extending openings therethrough, a plurality of rods located in the said openings arranged to abut the said energizing plate with their one ends, a plurality of ramp caps mounted respectively on the other ends of the said rods, an annular ramp ring located internally of the said second clutch housing portion, the said second clutch housing portion having a plurality of slots providing access to the said annular ramp ring, a plurality of mounting means on the said second clutch housing member adjacent the said slots respectively, a plurality of bell crank levers pivotally mounted on the said mounting means and arranged in radially disposed relation, ramp engaging means on each of the said levers arranged to engage selectively one of the said ramp caps or the said ramp ring, and axially movable operating means associated with the inner ends of the said levers, whereby movement of the said operating means in one direction causes the said ramp engaging means to engage the said ramp caps and move the said rods axially thereby moving the said energizing plate for applying one clutch assembly and axial movement of the operating means in the other direction engages the ramp engaging means with the said ramp ring for applying the other clutch assembly.

4. In combination, a rotatable input shaft, a coaxial rotatable output shaft telescopingly journalled within said input shaft, an annular drum assembly comprising a first housing portion, an intermediate plate portion and a second housing portion having a reentrant part which is splined to said output shaft, said reentrant part being held from axial movement by a snap ring, a pair of clutch assemblies in spaced-apart relation and carried in part by said first housing portion and said second housing portion respectively, spacer members separating said plate portion from said first housing portion and said second housing portion respectively, said shims having a plurality of circumferentially spaced holes located therein, an annular energizing plate, a plurality of projections extending radially outwardly from said energizing plate, the said first housing portion having a plurality of circumferentially spaced slots through which said projections extend, a plurality of holes circumferentially spaced in said plate portion, a plurality of holes circumferentially spaced in said second housing portion, said slots and holes being in alignment, axially slidable rods positioned in said slots and holes and butting against the said projections extending from the energizing plate, a ramp cap mounted on each of the said rods, an axially slidable ramp ring positioned within said second housing portion, a pair of spring washers, one of said spring washers being positioned between a first one of the clutch assemblies and said energizing plate, the other spring washer being positioned between the other said clutch assembly and said ramp ring, a plurality of slots in the said reentrant portion exposing said ramp caps and ramp ring, a plurality of circumferentially spaced, bifurcated bosses extending axially outwardly from said second housing portion, a plurality of radially disposed levers pivotally mounted on said bosses, roller means rotatably mounted at one end of each of said levers, an axially slidable sleeve mounted on said output shaft, and said sleeve having a plurality of axial extensions and pins mounted in said axial extensions and operatively engaging the inner ends of said levers.

References Cited in the file of this patent

UNITED STATES PATENTS

| | | |
|---|---|---|
| 758,768 | Mohlenhoff | May 3, 1904 |
| 1,260,599 | Tuttle | Mar. 26, 1918 |
| 2,546,064 | Gerst | Mar. 20, 1951 |
| 2,853,892 | Sheppard | Sept. 30, 1958 |